US009688406B2

(12) United States Patent
Schneider et al.

(10) Patent No.: US 9,688,406 B2
(45) Date of Patent: Jun. 27, 2017

(54) INTERIOR COMPONENT FOR A VEHICLE WITH A MODULAR PASSENGER SERVICE UNIT

(71) Applicant: Airbus Operations GmbH, Hamburg (DE)

(72) Inventors: Uwe Schneider, Hamburg (DE); Patrick Rollfink, Hamburg (DE); Diana Siehndel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 167 days.

(21) Appl. No.: 14/622,029

(22) Filed: Feb. 13, 2015

(65) Prior Publication Data

US 2015/0232182 A1    Aug. 20, 2015

(30) Foreign Application Priority Data

Feb. 14, 2014    (DE) .................. 10 2014 101 895

(51) Int. Cl.
| | |
|---|---|
| *B64C 11/00* | (2006.01) |
| *B64D 11/00* | (2006.01) |
| *B64D 25/00* | (2006.01) |
| *B64D 13/06* | (2006.01) |

(52) U.S. Cl.
CPC .......... *B64D 11/00* (2013.01); *B64D 11/0015* (2013.01); *B64D 13/06* (2013.01); *B64D 25/00* (2013.01); *B64D 2011/0046* (2013.01); *B64D 2011/0053* (2013.01)

(58) Field of Classification Search
CPC .... B64D 11/00; B64D 13/06; B64D 11/0015; B64D 2011/0053; B64D 2011/0046
See application file for complete search history.

(56) References Cited

U.S. PATENT DOCUMENTS

| 2010/0201950 A1 | 8/2010 | Budinger et al. |
| 2010/0237191 A1 | 9/2010 | Schneider et al. |
| 2011/0240796 A1 | 10/2011 | Schneider |
| 2012/0012707 A1 | 1/2012 | Schliwa et al. |
| 2012/0312921 A1 | 12/2012 | Grosse-Plankermann et al. |

(Continued)

FOREIGN PATENT DOCUMENTS

| DE | 102007014406 B3 | 4/2008 |
| DE | 102008058271 A1 | 5/2010 |
| DE | 102009058801 A1 | 6/2011 |

(Continued)

OTHER PUBLICATIONS

European Patent Office, European Search Report for European Patent Application No. 15154106 mailed Jul. 10, 2015.

*Primary Examiner* — Philip J Bonzell
*Assistant Examiner* — Michael Kreiner
(74) *Attorney, Agent, or Firm* — Lorenz & Kopf, LLC

(57) ABSTRACT

An interior component for an interior room of an aircraft is provided. The interior component includes a body having a first surface and a second surface and a multitude of functional modules which form a passenger service unit. The second surface is arranged opposite to the first surface and comprises a recess. The multitude of functional modules are arranged one after another in the recess in the longitudinal direction of the interior component, such that a first front surface of the functional module arranged frontally in the longitudinal direction closes flush with a first front surface of the body.

18 Claims, 3 Drawing Sheets

(56) References Cited

U.S. PATENT DOCUMENTS

2013/0149950 A1 6/2013 Umlauft et al.
2014/0065937 A1 3/2014 Schneider et al.

FOREIGN PATENT DOCUMENTS

| DE | 102010034410 A1 | 2/2012 |
| EP | 2657132 A2 | 10/2013 |
| WO | 2011/051148 A2 | 5/2011 |
| WO | 2011/079906 A2 | 7/2011 |
| WO | 2012040489 A1 | 3/2012 |

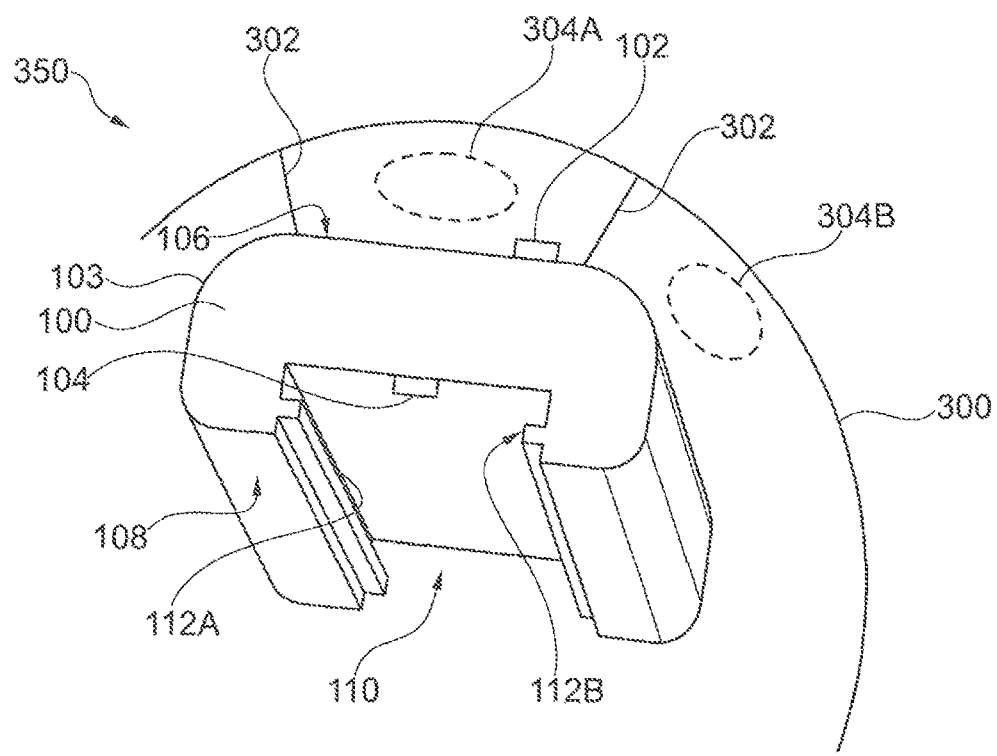
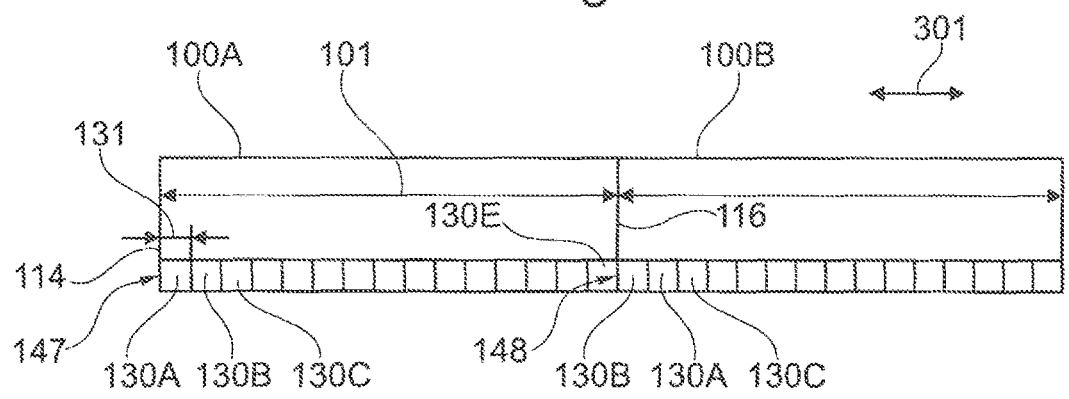
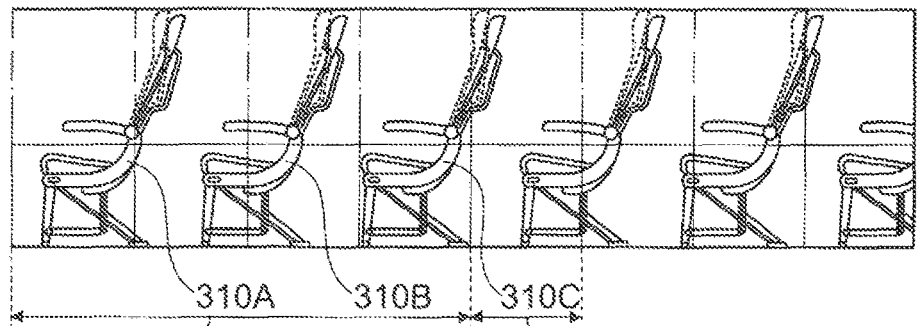
Fig. 1
Fig. 2

INTERIOR COMPONENT FOR A VEHICLE WITH A MODULAR PASSENGER SERVICE UNIT

CROSS-REFERENCE TO RELATED APPLICATION

This application claims the priority of the German Patent Application No. 10 2014 101 895.8, filed Feb. 14, 2014; which is incorporated herein by reference in its entirety.

TECHNICAL FIELD

The subject matter described herein generally relates to an interior component for an aircraft and to an aircraft comprising such an interior component and more specifically relates to an interior component for an aircraft that comprises a recess in which a multitude of functional modules for supplying one or several passengers are arranged.

BACKGROUND

In vehicles designed for passenger transport, in particular for the transport of a plurality of passengers, for example in an aircraft passenger compartment, functional modules are arranged above the passenger seats; i.e., in the overhead region above the passengers, which functional modules supply passengers with, for example, light, air, emergency oxygen, or information.

The functional modules form what is known as a passenger service unit (PSU). The position of the individual functional modules of the PSU depends on, among other things, the seat configuration in the passenger compartment. For example, illumination elements must be arranged so that an emitted light cone illuminates the region between two seats arranged one behind another, rather than illuminating the seat. Furthermore, control elements that are arranged in the overhead region must be conveniently accessible to the passengers.

The functional modules are, for example, supplied with air, electrical energy and control signals by way of a passenger service channel. To this end, the functional modules are coupled to the passenger service channel; i.e., to lines in the passenger service channel, by way of connection interfaces.

Usually, during assembly of an aircraft, the passenger service channel is routed in a first step before the seat configuration of the respective aircraft is established. In order to adapt the functional modules of the PSU to the seat configuration, the connection lines of the connection interface of the functional modules on the passenger service channel usually include overlength in order to reach any possible installation position of a functional module in the vehicle.

Moreover, because of component tolerances of the functional modules, slight variations in the final installation position of the functional modules in the aircraft can occur, and for this reason also, overlengths in the connection lines on the passenger service channel may be required in order to compensate for these tolerance-related variations in the installation position. It may be necessary for the overlengths in the connection lines to be attached to the fuselage structure merely at a specified maximum distance from a functional module to avoid overlengths that are not attached.

WO 2011/079906 A2 and US 2012/312921 A1 describe a system component module for installation in an aircraft passenger cabin having a carrying device to which a PSU channel and an individual air supply system are attached. A fastening device is designed to fasten the system component module to a base plate of a stowage bin provided in the aircraft passenger cabin.

It would therefore be desirable to provide an interior component with functional modules of a passenger service unit that enables simpler installation in a vehicle as well as providing shorter overlengths of connection lines of the functional modules.

In addition, other objects, desirable features and characteristics will become apparent from the subsequent summary and detailed description, and the appended claims, taken in conjunction with the accompanying drawings and this background.

SUMMARY

This summary is provided according to a first embodiment, an interior component for an interior room of an aircraft is provided. The interior component comprises a body having a first surface and a second surface. Furthermore, the interior component comprises a multitude of functional modules that form a passenger service unit. The second surface is arranged opposite the first surface and comprises a recess. The multitude of functional modules are arranged one after another in the recess in the longitudinal direction of the interior component, such that a first front surface of the functional module arranged frontally in the longitudinal direction closes flush with a first front surface of the body. In this manner the interior component described herein and below makes it possible for the functional modules to be installed or fastened with reference to the interior component or its front surface, rather than with reference to the entire passenger compartment.

If the functional modules are installed with reference to the entire passenger compartment, because of cumulative component tolerances of the functional modules, over the entire length of the passenger compartment of an aircraft this can result in very considerable fluctuation of the positions of the functional modules. These fluctuations can be prevented or reduced in that the functional modules are installed with reference to an interior component. Equipment tolerances thus have an effect only in the region of an interior component.

If two interior components that are essentially identical are installed one after another in a passenger compartment, component tolerances of the functional modules in an interior component do not have an effect on the position of the functional modules in the second interior component, because the functional modules are arranged such that the front functional module in each case closes flush with a front surface of the interior component.

A functional module can, in particular, be provided for supplying an entire seat row; in other words seats arranged side by side, so that a functional module can comprise several functional units of the same type that are arranged side by side. Various functions for a seat row are made possible in that various functional modules are arranged one after another and are associated with a seat row. Depending on the manner in which the interior component is arranged in the longitudinal direction with reference to the seats or the seat rows, the position or the order of the functional modules in the longitudinal direction of the interior component can vary. If the seat configuration is changed to the effect that the seat pitch of seats arranged one after another is increased, the functional modules associated with a seat can also be displaced, and any resulting gaps can be covered by socalled blank modules. The blank modules can be flat elements, for example flat panels without any further function, for merely covering up the resulting gaps.

The term recess refers to an indentation in the second surface that makes it possible to spatially accommodate the functional modules.

The notion of closing flush refers to the front functional module in the longitudinal direction of the interior component starting or ending essentially at the same height as the front surface of the interior component without in the longitudinal direction projecting beyond the front surface of the interior component.

According to one embodiment, a second front surface of the rear functional module, when viewed in the longitudinal direction, closes flush with a second front surface of the body. Thus, the functional modules arranged in the recess of the interior component extend over the entire length of the interior component. If such interior components are installed one after another in the longitudinal direction and if they adjoin, it is possible to provide any desired functional module at any desired position.

According to a further embodiment, the multitude of functional modules comprise an identical extension in the longitudinal direction.

In this manner any two functional modules can be positionally changed without this necessitating a change in the position of the other functional modules. Thus, in the case of a change in the seat configuration in the passenger compartment, the adaptation expenditure relating to the functional modules of the passenger service unit is reduced.

According to a further embodiment, a functional module extends in a direction across the longitudinal direction over the entire extension of the recess, in other words over the entire width of the recess. The recess can, in particular, comprise a constant width so that the functional modules also comprise an identical width.

According to a further embodiment, the length of the body corresponds to an integral multiple of the length of a functional module. In this arrangement the length of the functional module corresponds to its extension in the longitudinal direction of the interior component.

According to a still further embodiment, the interior component comprises a fastening element by means of which each functional module of the multitude of functional modules is reversibly mechanically coupled.

In this arrangement the fastening element is used for positioning the functional module with reference to the interior component. Attachment of the functional modules can take place with non-positive fit or with positive fit as well as with or without the use of a tool. According to a further embodiment the fastening element is arranged in the recess.

According to a further embodiment the fastening element is a fastening rail that extends in the longitudinal direction of the interior component. In this embodiment, the functional modules can be displaced along the fastening rail in the longitudinal direction of the interior component, provided fastening of the functional modules to the fastening rail allows such movement. The functional modules can be attached to the fastening rail in such a manner that the functional modules are held in the recess of the interior component while movement along the fastening rail is still possible. If a functional module is in its intended position, affixation in the longitudinal direction of the fastening rail can also take place.

According to a further embodiment, the interior component comprises a first interface for connecting the interior component to a passenger service channel. Thus, the connection lines of the passenger service channel are no longer coupled to the functional modules but instead to the interior component. In this manner hitherto existing overlengths of these connection lines can be reduced in that the first interface is arranged on the interior component at a constant position. In terms of connection to the passenger service channel, the actual position of the functional modules is immaterial. By reducing overlengths in the connection lines of the passenger service channel, the overall weight of a vehicle and the installation space required for cabling and the passenger service channel can be reduced.

According to another embodiment, the interior component comprises a second interface for connecting the multitude of functional modules to the interior component. The functional modules are functionally connected directly to the interior component, i.e., for example, a functional module comprising an air outlet is connected to an air duct; an illumination element is connected to an electrical line; and a display element is connected to a data transfer line.

According to a further embodiment, the second interface is coupled to the first interface so that the functional modules can be coupled indirectly to the passenger service channel. The second interface can comprise the different connection lines described above and is connected by way of interconnection lines to the corresponding connection lines of the first interface so that the functional modules can, by way of the interconnection lines, be coupled directly to the passenger service channel. Because the functional modules are not directly coupled to the passenger service channel, there is no longer any need to provide an overlength in the connection lines of the passenger service channel on account of unforeseeable positions of the functional modules because the passenger service channel is coupled to the first interface of the interior component, whose position is independent of the position of the functional modules.

According to a further embodiment, the multitude of functional modules comprise at least one functional module selected from the group comprising a display element, an illumination element, a ventilation element, an emergency oxygen supply unit, an extendable projection surface, and a projector.

According to a still further embodiment, the interior component is a hatrack; i.e., a stowage shelf or a stowage compartment. In the body of the interior component, there is an interior room for accommodating baggage, and on the underside of the baggage compartment the functional modules are arranged in a recess.

According to a further embodiment, an aircraft comprising an interior component as described above and below is provided. The aircraft comprises a passenger compartment with a multitude of seats arranged one after another. The interior component is arranged in the passenger compartment above the multitude of seats. The interior component is mechanically coupled to a fuselage structure of the aircraft by means of a fastening device. The interior component as described above and below makes it possible to pre-install the functional modules on the interior components that can then be installed in the aircraft together with the functional modules. The position of the first connection interface of the interior component for connection to the passenger service channel is known, and thus it is also possible to affix the connection line of the passenger service channel with reference to the fuselage structure, rather than having to be adjusted depending on the position of a functional module, which position is determined only at a later stage. Because of the design of the interior component, it is possible to subsequently alter the position of the functional modules without this requiring the connection line to be positioned anew on the passenger service channel and to be affixed thereto. Thus, the required overlength of this connection line can be shorter. Likewise the interior component can be used for retrofitting existing aircraft.

These and other objects, features, and advantages will become apparent from the following detailed description taken in conjunction with the accompanying drawings.

BRIEF DESCRIPTION OF THE DRAWINGS

The various embodiments will hereinafter be described in conjunction with the following drawing figures, wherein like numerals denote like elements, and:

FIG. 1 is a diagrammatic view of an aircraft comprising an interior component according to a first exemplary embodiment;

FIG. 2 is a diagrammatic view of a passenger compartment comprising two interior components according to a further exemplary embodiment;

DETAILED DESCRIPTION

Figure 3:
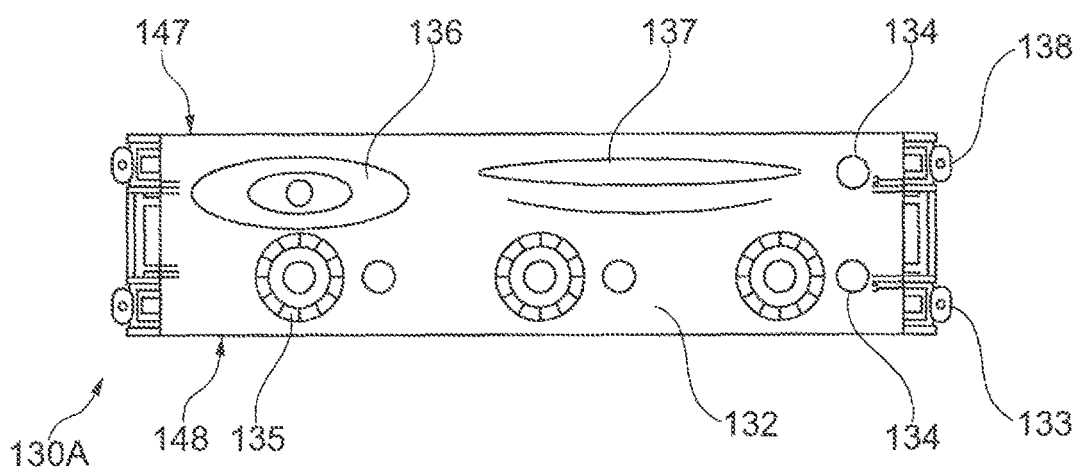
FIG. 3 illustrates a functional module for an interior component according to a further exemplary embodiment.

The following detailed description is merely exemplary in nature and is not intended to limit the disclosed embodiments or the application and uses thereof. Furthermore, there is no intention to be bound by any theory presented in the preceding background detailed description.

The illustrations shown and described herein are diagrammatic and not to scale. If in the following description of the figures the same reference characters are used, they relate to identical or similar elements.

FIG. 1 shows a view of an aircraft 350 comprising a fuselage structure 300. The fuselage structure 300 encloses a passenger compartment in which the interior component 100 is located. By way of fastening elements 302, the interior component 100 is mechanically coupled to the fuselage structure 300 and is arranged in an overhead region of the passenger compartment, as is also evident from FIG. 2, which will be described below.

By way of a first connection interface 102, which is arranged on a first surface 106 of the body 103 of the interior component 100, the interior component 100 is connected to a passenger service channel 304A and 304B. The interconnection lines are not shown in FIG. 1. To this end, known interconnection lines and connection technology can be employed. The two dashed positions of the passenger service channel show possible optional positions, and the position of the passenger service channel relative to the interior component is irrelevant.

The interior component 100 comprises a second surface 108, which is arranged opposite the first surface 102 and which extends in the direction of the passenger compartment. The second surface 108 comprises a recess 110 that extends in the longitudinal direction of the interior component and is designed to accommodate the functional modules. A recess 110 a second connection interface 104 is arranged in recess 110, by means of which the functional modules are coupled. It is also possible for several connection interfaces to be arranged in the recess 110.

The first connection interface 102, which can also be referred to as the connection interface on the aircraft side, and the second connection interface 104, which can also be referred to as the connection interface on the functional module side, are interconnected in such a manner that electrical energy, electrical signals or an air flow can be transmitted from the passenger service channel by way of the first connection interface to the second connection interface, and the functional modules can be connected to the second connection interface.

In the recess 110, fastening elements 112A and 112B in the form of fastening rails are arranged that extend in the longitudinal direction of the interior component. The fastening rails are arranged on the sidewalls opposite the recess. It should be pointed out that in the longitudinal direction of the passenger compartment, which direction extends into the drawing plane, several interior components can be arranged one after another in particular so that the front surfaces of adjacent interior components adjoin, and in particular rest one against another. For the sake of clarity, the functional modules are not shown in FIG. 1; however, they are shown in the subsequent figures. Fastening of the functional modules in recess 110 can take place in by pushing the functional modules consecutively and in the provided order in the longitudinal direction of the interior component along the fastening rail, to their positions, or alternatively in that the functional modules are fastened from below to the fastening element.

FIG. 2 is a diagrammatic lateral view of a passenger compartment. A plurality of seat rows are arranged one after another, with each seat row comprising several seats 310A, 310B, and 310C arranged side by side. Affixed above the seats are two interior components 100A and 100B, arranged one after another in the longitudinal direction 301, with a multitude of functional modules 130A, 130B, and 130C arranged one after another in the longitudinal direction 301 on the underside, i.e. the second surface 108, of the interior components 100A and 100B. The foremost functional module 130A is arranged such that a front surface 147 of the functional module 130A closes flush with the front surface 114 of the interior component 100A. The front surface 148 of the rearmost functional module 130E closes flush with the front surface 116 of the interior component 100A. An interior component 100A and 100B is dimensioned such that the length 101 of the interior component extends over three seat rows, thus corresponding to the length 312 that corresponds to three times the single seat pitch 311.

The length 131 of a functional module is dimensioned such that the length 101 corresponds to an integral multiple of the length 131 so that the functional modules cover the entire length of the recess 110. Since the functional modules are identical in length, their order can be selected at will in the longitudinal direction 301. For example, in the interior component 100A, the functional modules are arranged in the order 130A, 130B, and 130C, whereas in the interior component 100B the functional modules are arranged in the order 130B, 130A, and 130C.

FIG. 2 shows a standard seat configuration in which the pitch 311 is, for example, 28 inch (71.12 cm). In this example, the pitch 312 and the length 101 are 84 inch (213.36 cm), and with a total number of 15 functional modules (5 functional modules for each seat row) the length 131 corresponds to 5.6 inch (14.224 cm). If the seat configuration, for example the seat pitch, is altered, this may require a change in the positions of the functional modules. Such a change may include two functional modules merely swapping positions, or in that a functional module is pushed to some other position after at least one functional module has been removed from the recess. The change in the position of a functional module can take place without the functional coupling with the passenger service channel having to be detached and at the target position having to be re-established, and without the connection lines to the passenger service channel first having to be detached from the fuselage structure and fastened anew.

The interior component as described above and below also makes possible local adaptation of the position of the functional modules without the need for adaptation of the positions of the functional modules in the entire passenger cabin. For example, if the order of the functional modules on the interior component 100A is altered, the order and the position of the functional modules on the interior component 100B are not influenced because in each case the functional modules have been installed with reference to an interior component rather than with reference to the passenger compartment or to the fuselage structure.

FIGS. 3 to 7 illustrate various functional modules that share the same basic design. One functional module comprises a carrying plate 132 that, by way of coupling elements 133, can be mechanically coupled to the fastening element 112A and 112B of the interior component. To this end, a functional module comprises functionally specific units that by way of an interface can be coupled to the second connection interface 104 of the interior component. The carrying plates 132 of the different functional modules have identical dimensions so that the functional modules can be rearranged at will, i.e. can replace any other functional module at the latter's position without there being a need to rearrange adjacent functional modules.

FIG. 3 shows a functional module 130A comprising three illumination elements 135, arranged side by side from left to right, so that in the installed state of the functional module 130A their position corresponds to the position of the seats in a seat row comprising three seats. The illumination elements can, for example, be reading lights that can be switched on or off by way of an actuating element 134 in the form of a switch or a button. Other actuating elements can be provided, for example to call a cabin attendant. Apart from the above, the functional module 130A comprises a loudspeaker 136 and a display unit 137 for reproducing optical signals.

Figure 4:
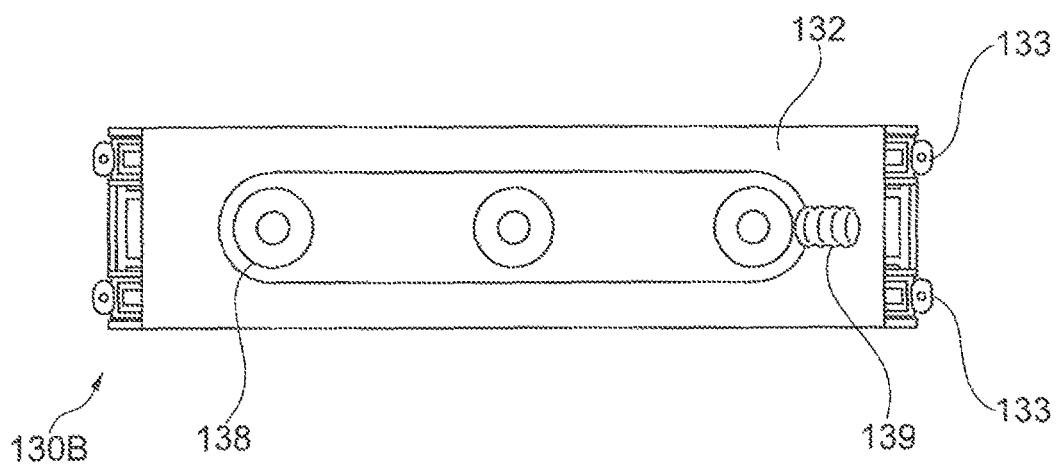
FIG. 4 illustrates a functional module for an interior component according to a further exemplary embodiment.

FIG. 4 shows a functional module 130B comprising three air outlets 138 that analogous to the illumination elements 135 are arranged side by side and are connected to the second connection interface 104 by way of an air line 139.

Figure 5:
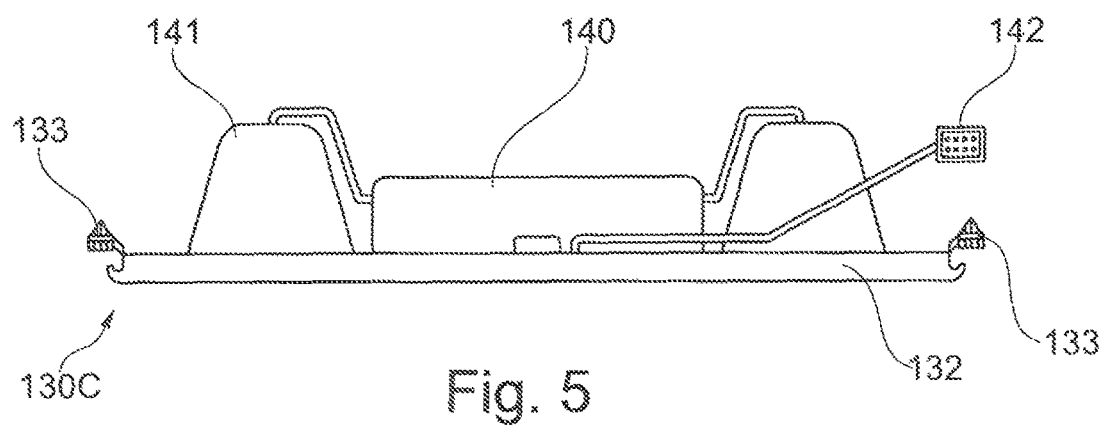
FIG. 5 illustrates a functional module for an interior component according to a still further exemplary embodiment.

FIG. 5 shows a functional module 130C designed to provide an emergency oxygen supply. To this end, an oxygen cylinder 140 is arranged that supplies oxygen by way of oxygen masks that are arranged in the housing 141. When oxygen is required, a signal is transmitted to the connection interface 142 by way of the second connection interface 104 so that the oxygen masks drop from the housing 141 into the passenger compartment where they supply passengers with emergency oxygen.

Figure 6:
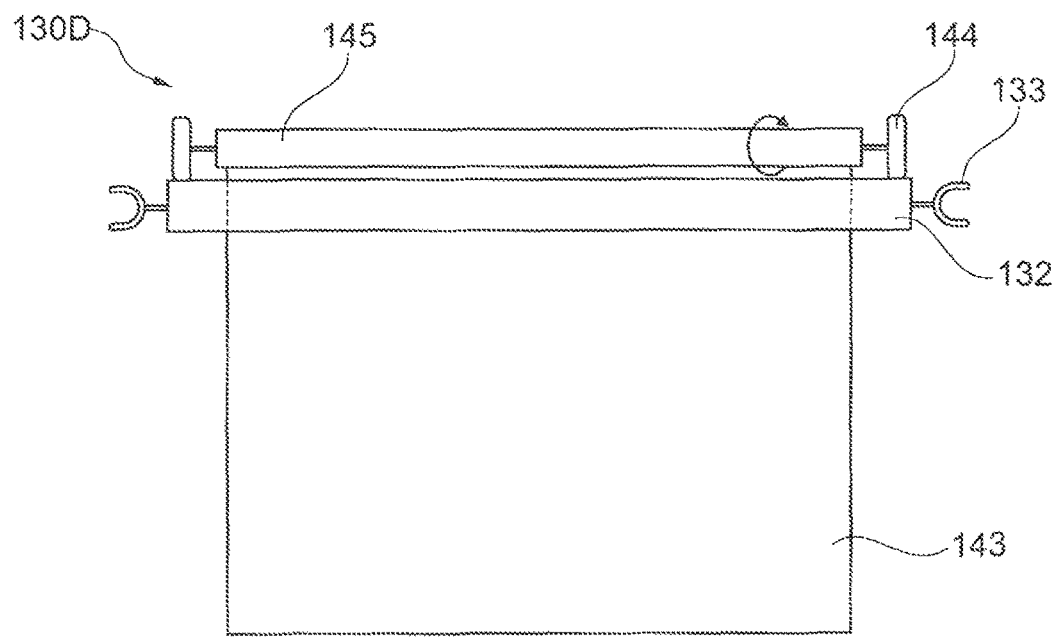
FIG. 6 illustrates a functional module for an interior component according to a yet another exemplary embodiment.

FIG. 6 illustrates a functional module 130D with an extendable projection surface 143. The projection surface 143 comprises a foldable frame that in the extended state provides stability. As an alternative, the projection surface 143 can comprise a gas-inflatable or fillable or fluid-inflatable or fillable frame to achieve stability. By way of rotary movement of a coiling element 145, the projection surface 143 is extended into the passenger compartment or moved from it. The coiling element 145 is driven by way of an actuator 144, for example an electric motor. The projection surface 143 can be used to reproduce visual information or to play back an entertainment program. Retracting and extending the projection surface 143 can be controlled by a passenger in relation to the particular projection surface allocated to the passenger, or can be controlled from a central position in relation to all the projection surfaces in the passenger compartment. To this end the actuator 144 is supplied with electrical energy by way of the second connection interface 104 of the interior component.

Figure 7:
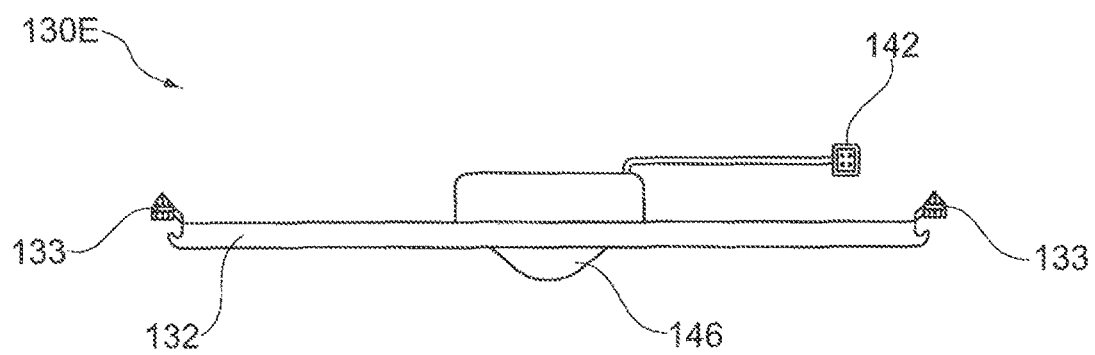
FIG. 7 illustrates a functional module for an interior component according to a further exemplary embodiment.

FIG. 7 illustrates a functional module 130E comprising a projector 146 that is designed to project an image onto the projection surface 143 shown in FIG. 6. The projector receives the image information from the second connection interface 104 by way of the connection interface 142.

It should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An interior component for an interior room of an aircraft, comprising:
   a body having a first surface and a second surface; and
   a multitude of functional modules forming a passenger service unit;
   wherein the second surface is arranged opposite the first surface;
   wherein the second surface comprises a continuous recess in a longitudinal direction along the entire length of the interior component;
   wherein the multitude of functional modules are arranged one after another in the recess in the longitudinal direction of the interior component, such that a first front surface of the functional module arranged frontally in the longitudinal direction closes flush with a first front surface of the body, and wherein the recess and the functional modules are configured such that the functional modules are pushable along the recess from the first front surface of the body to a second front surface of the body;
   wherein the multitude of functional modules comprise an identical extension in the longitudinal direction; and wherein a length of the body corresponds to an integral multiple of the length of a functional module.

2. The interior component of claim 1, wherein a second front surface of a rear functional module closes flush with the second front surface of the body.

3. The interior component of claim 1, wherein a functional module extends in a direction across the longitudinal direction over the entire extension of the recess.

4. The interior component of claim 1, further comprising a fastening element by means of which each functional module of the multitude of functional modules is reversibly mechanically coupled.

5. The interior component of claim 4, wherein the fastening element is arranged in the recess.

6. The interior component of claim 4, wherein the fastening element is a fastening rail that extends in the longitudinal direction of the interior component.

7. The interior component of claim 1, further comprising a first interface for connecting the interior component to a passenger service channel.

8. The interior component of claim 7, further comprising a second interface for connecting the multitude of functional modules to the interior component.

9. The interior component of claim 8, wherein the second interface is coupled to the first interface so that the functional modules can be coupled indirectly to the passenger service channel.

10. The interior component of claim 1, wherein the multitude of functional modules comprise at least one functional module selected from the group comprising a display element, an illumination element, a ventilation element, an emergency oxygen supply unit, an extendable projection surface, and a projector.

11. The interior component of claim 1, wherein the interior component is a hatrack.

12. An aircraft with an interior component, comprising:
a passenger compartment with a plurality of seats arranged one after another;
wherein the interior component is arranged in the passenger compartment above the multitude of seats; and
wherein the interior component comprises:
a body having a first surface and a second surface; and
a multitude of functional modules that form a passenger service unit;
wherein the second surface is arranged opposite the first surface;
wherein the second surface comprises a continuous recess in a longitudinal direction along the entire length of the interior component;
wherein the multitude of functional modules are arranged one after another in the recess in the longitudinal direction of the interior component, such that a first front surface of the functional module arranged frontally in the longitudinal direction closes flush with a first front surface of the body, and wherein the recess and the functional modules are configured such that the functional modules are pushable along the recess from the first front surface of the body to a second front surface of the body;
wherein the multitude of functional modules comprise an identical extension in the longitudinal direction; and
wherein a length of the body corresponds to an integral multiple of the length of a functional module.

13. The interior component of claim 12, wherein a second front surface of the a rear functional module closes flush with the second front surface of the body.

14. The interior component of claim 12, wherein a functional module extends in a direction across the longitudinal direction over the entire extension of the recess.

15. The interior component of claim 12, further comprising a fastening element by means of which each functional module of the multitude of functional modules is reversibly mechanically coupled.

16. The interior component of claim 12, further comprising a first interface for connecting the interior component to a passenger service channel.

17. The interior component of claim 16, further comprising a second interface for connecting the multitude of functional modules to the interior component.

18. The interior component of claim 12, wherein the multitude of functional modules comprise at least one functional module selected from the group comprising a display element, an illumination element, a ventilation element, an emergency oxygen supply unit, an extendable projection surface, and a projector.

* * * * *